United States Patent [19]
Senzaki

[11] 4,265,460
[45] May 5, 1981

[54] TOOL HOLDER
[75] Inventor: Chikara Senzaki, Nara, Japan
[73] Assignee: Manyo Tool Kabushiki Kaisha, Nara, Japan
[21] Appl. No.: 59,750
[22] Filed: Jul. 23, 1979
[30] Foreign Application Priority Data
Jul. 26, 1978 [JP] Japan ................................ 53-90450
[51] Int. Cl.³ .............................................. B23B 5/22
[52] U.S. Cl. ................................................... 279/97
[58] Field of Search ....................... 279/97, 86, 83, 76; 408/239 R, 240, 232, 233; 409/232, 234; 403/370, 374, 378, 379

[56] References Cited

U.S. PATENT DOCUMENTS

| | | | |
|---|---|---|---|
| 2,700,549 | 1/1955 | Cornett | 279/97 |
| 3,091,474 | 5/1963 | Boutros et al. | 279/97 |
| 3,618,962 | 11/1971 | Cox | 279/97 |
| 3,811,694 | 5/1974 | Dahlman et al. | 279/83 |

Primary Examiner—Harrison L. Hinson
Attorney, Agent, or Firm—Bruce A. Jagger

[57] ABSTRACT

A tool holder has a bore adapted to receive therein a tool having locking flat surfaces on the shank thereof, and a peripheral wall defining the bore; tangential holes running across the peripheral wall and having an aperture open to the bore; and locking cotters each having an inclined surface and disposed in each tangential hole movably in the axial direction thereof. Displacement of each locking cotter towards the mid portion of the tangential hole causes the inclined surface to press against the flat surface of the shank due to the wedge effect, thereby locking the shank to the peripheral wall. Increasing torque, which acts on the shank, moves the locking cotter in the axial direction to a further extent, thus providing an increased wedge effect, whereby a greatly increased shank retaining force is obtained.

11 Claims, 11 Drawing Figures

FIG. 4  FIG. 5  FIG. 6
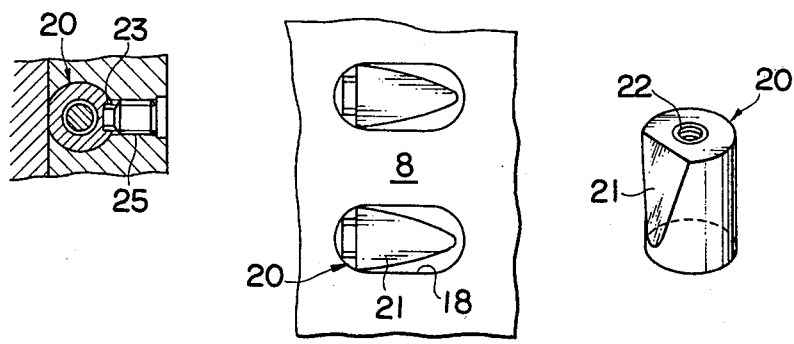
FIG. 9  FIG. 11
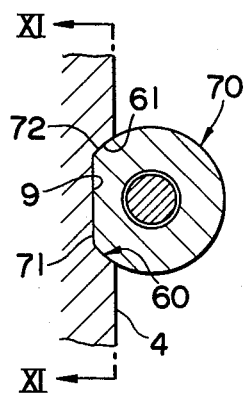 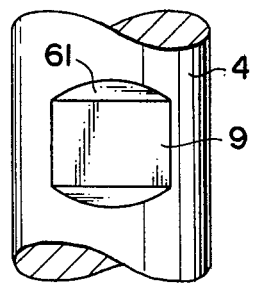
FIG. 10
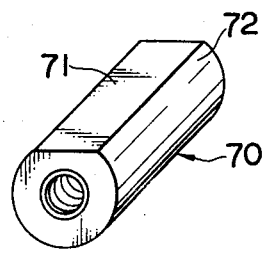

TOOL HOLDER

BACKGROUND OF THE INVENTION

1. Field of the Invention

This invention relates to a tool holder for holding a straight shank of a cutting tool or a tool adapter, which straight shank has flat surfaces on part of the outer peripheral surface thereof.

2. Description of the Prior Arts

Generally, a cutting tool employs a straight shank provided with flat surfaces along the secant of the outer circumferential circle of the shank. The prior art tool holder for holding a straight shank with flat surfaces has been such that set-screws are driven into the wall of the holder at a right angle with respect to the flat surfaces of the straight shank inserted in the holder, in a manner that the tips of set-screw stems are brought into engagement with the flat surfaces of the shank directly, whereby the shank is locked to the holder.

In the prior art tool holder, each set-screw functions as a cantilever, so that the shank-locking force is sustained by the tip of each set-screw, and the locking surface by which the shank is locked to the holder is confined only to the tip of the set-screw. Because of such mechanism, the tip face of each set-screw suffers deformation, which eventually develops into damage in a threaded portion, when that force acts on the tip of set-screw transversely thereof, which force originates from an unusual or greatly strong cutting force at the cutting operation. Furthermore, since each set-screw directly engages each flat surface of the shank, vibration arising at the cutting operations is directly transmitted to the tip face of each set-screw, with a likelihood that engagement of the tip of each set-screw with each flat surface of the shank becomes released.

SUMMARY OF THE INVENTION

The present invention is accordingly directed to overcoming the above-described drawbacks as well as providing an increased shank holding force.

Generally speaking, due to the cutting force exerted by way of a cutting tool on a workpiece at the cutting operation, a torque acts on the shank of the cutting tool to turn same, and such torque increases with increase in the cutting force. Taking this fact in view, there are provided, according to the present invention, locking surfaces displaceable in a direction substantially tangential to the outer peripheral surface of the shank, and a torque acting on the shank is utilized, so as to increase the shank holding force in proportion to increase in the cutting force.

It is a principal object of the present invention to provide a tool holder, wherein with increase in the cutting force at the cutting operation, a shank-holding force increases in proportion thereto, whereby a straight shank is locked to the holder.

It is another object of the present invention to provide a tool holder, wherein locking surfaces respectively large enough to cover the whole area of each flat surface of a straight shank are provided, thus being resistant to deformation in the event that the shank receives a strong cutting force.

It is a further object of the present invention to provide a tool holder, wherein the locking surfaces are maintained independent of vibration arising at the cutting operation.

These and other objects and features of the present invention will be apparent from the ensuing part of the specification in conjunction with drawings which indicate preferred embodiments of the invention.

BRIEF DESCRIPTION OF THE DRAWINGS

FIG. 4 is a fragmentary cross sectional view taken along the line IV—IV of FIG. 2;

FIG. 5 is an elevational view, as viewed along the line V—V of FIG. 1;

FIG. 6 is a perspective view of a locking cotter;

FIG. 9 is a fragmentary cross sectional view showing the modification of the connection between the locking cotter and the straight shank;

FIG. 10 is a perspective view of a modified locking cotter; and,

FIG. 11 is a fragmentary plan view of a straight shank as viewed along the line XI—XI of FIG. 9.

DESCRIPTION OF THE PREFERRED EMBODIMENTS

Figure 1:
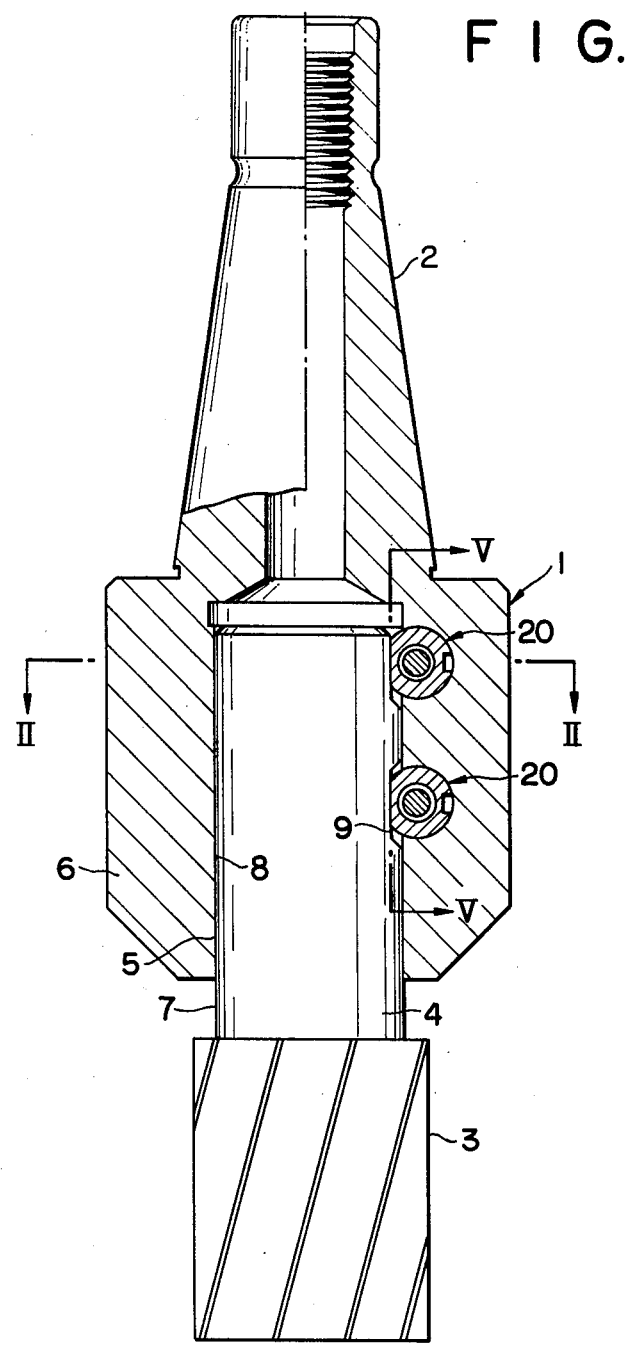
FIG. 1 is a longitudinal cross sectional view of a tool holder into which a straight shank of a cutting tool is inserted, according to the present invention.

Referring first to FIG. 1, a tool holder includes; a holder body 1 which receives therein a straight shank of a cutting tool, such as a drill or a milling, a tool adapter or the like; and a shank portion 2 integral with the holder body and adapted to be coupled to a main shaft (not shown) of a machine tool, such as a milling machine, a lathe or a drilling machine. Shank portion 2 is tapered towards the free end thereof, so as to be accommodated to the main shaft hole of a such a machine tool and has a bolt hole, according to a prior art.

Holder body 1 has a bore 5 presenting a circular cross section and receiving therein a straight shank 4 of a cutting tool 3, and a thick wall 6 encompassing the bore. Straight shank 4 is fittedly inserted into bore 5, with its outer peripheral surface 7 sliding along the inner peripheral wall 8 of the holder body, as in the prior art holder. Straight shank 4 is cut at desired portions on the outer peripheral surface thereof, to thereby provide flat surfaces 9 as best seen in FIGS. 1 through 3, the flat surfaces being provided along a secant of the outer circumference of the shank.

Figure 2:
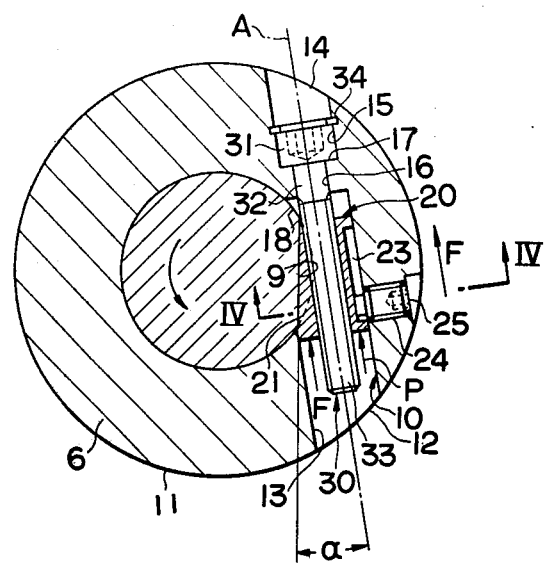
FIG. 2 is a transverse cross sectional view taken along the line II—II of FIG. 1.
Figure 3:
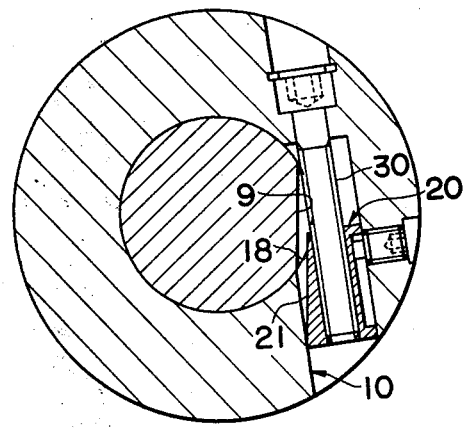
FIG. 3 is a transverse cross sectional view similar to FIG. 2, wherein a locking cotter is shown as being released from the locked position.

In FIG. 2, a tangential hole 10 is provided in the peripheral wall 6 of holder body 1 along an axis of A extending substantially in a direction tangential to the cylindrical peripheral surface of straight shank 4 at an angle of $\alpha$ with respect to each flat surface 9 of the shank, when inserted into bore 5 of the holder body. An angle of inclination $\alpha$ of tangential hole 10 with respect to the flat surface is in the range of 10 to 20 degrees.

Tangential hole 10 is a stepped cylindrical hole running across the wall 6 of holder body 1 along axis A, and consists of a cotter passage 13 having a cotter-insertion port 12 open from one point on the outer peripheral surface 11 of the holder body, a screw-head receiving hole 15 having a screw-insertion port 14 open from the outer point on the outer peripheral wall 11 of the holder body, and a diametrically reduced portion 16 leading from the hole 15 to the passage 13, thereby forming a stepped portion or shoulder portion therebetween. Cotter passage 13 of trangential hole 10 has an oval aperture 18 (FIG. 5) adjoining to bore 5 and conforming to the curved inner peripheral wall 8 of the holder body. Each aperture 18 is substantially in register with each flat surface 9 on the straight shank, and as large in size as permitting the inclined surface of a locking cotter to project therethrough into the bore.

In cotter passage 13 of tangential hole 10, there is disposed a locking cotter 20 movable along axis A and serving as a locking element, as best seen in FIG. 2. Locking cotter 20 is of a columnar shape adapted to be loosely fitted in the cylindrical cotter passage 13 and tapered toward one end thereof in part of the outer peripheral surface thereof, thereby providing an inclined surface or slope 21, as seen in FIG. 6. Slope 21 has a gradient equal to the angle of inclination α of tangential hole 10 with respect to the flat surface of the shank, as clearly shown in FIG. 2. In assembly, locking cotter 20 may be inserted into cotter passage 13 through cotter-insertion port 12 of the tangential hole.

Referring further to FIG. 2, a locking screw 30 is threaded into locking cotter 20, so that the turning of the locking screw causes the locking cotter to move along tangential hole 20. Locking screw 30 is a flat-head bolt with a hexagonal hole, which consists of a head portion 31 loosely fitted in screw-head receiving hole 15 of the tangential hole, a stem portion 32 carried by diametrically reduced portion 16 of the tangential hole, and a threaded portion 33 threaded into a threaded hole 22 running through the length of locking cotter 20. In assembly, locking screw 30 is inserted into the tangential hole through screw-insertion port 14 thereof. The flat head of the locking screw is rotatably seated on step portion 17 of screw-head receiving hole 15, and a stop ring 34 is loosely fitted in a peripheral groove provided in screw-head receiving hole 15 of the tangential hole. Stop ring 34 is adapted to engage the bolt head 31, when locking cotter 20 is displaced to a position shown in FIG. 3, thereby preventing release of locking screw 30 from the engagement with step portion 17, which would lead to an unexpected removal of the locking screw from the hole.

As is seen from FIGS. 2, 3 and 4, locking cotter 20 has an acial groove running on the outer peripheral surface thereof in a portion diametrically opposite to the inclined surface 21, into which groove is loosely fitted a tip of a set-screw 25 driven into a threaded hole 24 provided in the peripheral wall 6 of holder body 1, so as to prevent the undesired turning of locking cotter 20 which would be caused by the turn of locking screw 30. Thus, the locking cotter permits to move within the tangential hole, with its inclined surface 21 maintained usually in a constant direction relative to flat surface 9 of the straight shank. Engagement of the tip of set-screw 25 with the longitudinal wall of axial groove 23 imposes a limitation on displacement of the locking cotter along the tangential hole.

In FIG. 2, locking cotter 20 is shown in a position in which the inclined surface 21 projects through aperture 18 into bore 5, so as to tighten the straight shank to the holder body. When locking screw 30 is turned in one direction by means of any suitable screw driver, locking cotter 20 is displaced from the position shown in FIG. 2 to the position shown in FIG. 3 in which the inclined surface 21 of the cotter diverts from flat surface 9, to thereby release the straight shank from the locked position. When locking screw 30 is turned in the reverse direction, locking cotter 20 is displaced from the position shown in FIG. 3 to the position shown in FIG. 2. From this, it will be understood that locking screw 30 functions as a thrust means for advancing or retracting locking cotter 20 towards or from flat surface 9 of the straight shank within tangential hole 10.

Figure 7:
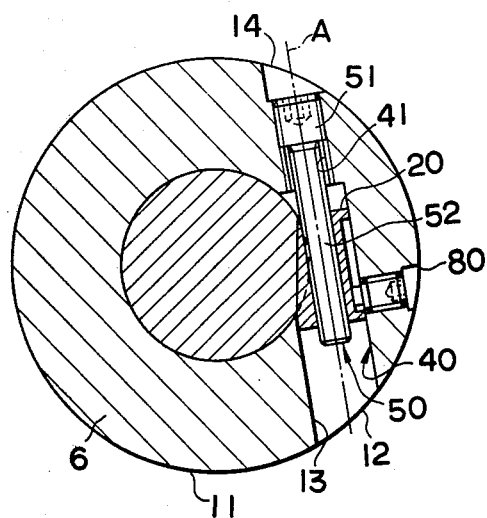
FIG. 7 is a transverse cross sectional view similar to FIG. 2, which shows a tangential hole and a locking screw in the modified form.
Figure 8:
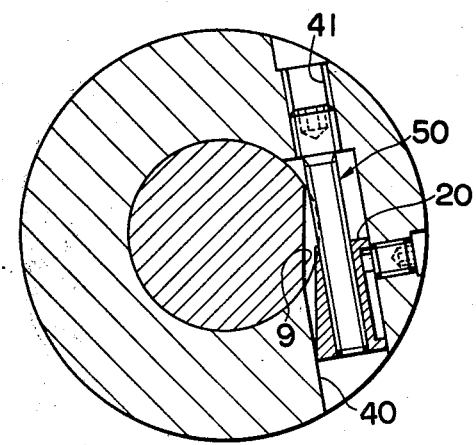
FIG. 8 is a transverse cross sectional view similar to FIG. 3, which shows the tangential hole and the locking screw in the modified form.

FIGS. 7 and 8 show a modification of FIGS. 2 and 3, respectively, for facilitating displacement of locking cotter 20 from the advanced position to the retracted position relative to the flat surface, and vice versa, so as to curtail a time necessary for locking or unlocking the straight shank to or from the holder body. The structure shown in FIGS. 7 and 8 are similar to those of FIGS. 2 and 3, except for configurations of a tangential hole 40 and a locking screw 50 and the connection therebetween.

More in detail, tangential hole 40 in this embodiment is a cylindrical hole running cross the peripheral wall 6 of the holder body along axis A, and consists of cotter passage 13 having port 12 open from one portion on the outer peripheral surface 11 of wall 6 of the holder body, and a threaded hole 41 having bolt-insertion hole 14 open from the other portion on the outer peripheral wall thereof. Locking screw 50 has a threaded head portion 51 threaded into a threaded hole 41 of tangential hole 40 and a threaded portion 52 threaded into an axial threaded hole in locking cotter 20 and piercing therethrough. Locking screw 50 per se is turned to go into or out of the tangential hole along axis A, to thereby cause locking cotter to advance or retract towards or from flat surface 9 of the straight shank, thereby curtailing a time necessary for locking or unlocking the straight shank to or from the holder body.

FIGS. 9 through 11 show a modification of the connection between the locking cotter and the straight shank. In view of the fact that, at the heavy cutting operation by means of a cutting tool with a torsional cutter blade, a resistance exerted on the cutting edge acts on the straight shank in the axial direction thereof to tend withdrawing the shank from the holder body, this embodiment is so arranged as to retain the shank in the holder body against such tendency.

In this embodiment, the straight shank has substantially a channel-shaped groove having a flat bottom 9 and opposing arcuate rising walls 61 as best seen in FIG. 9. A locking cotter 70 has a slope or inclined surface 71 large enough to cover nearly the whole area of flat surface of the shank, and arcuate shoulder portions adjoining to and along the longitudinal opposite edges of slope 71, whose shoulder portions conform in contour to that of the opposing arcuate rising wall portion 61 of the groove, as seen in FIGS. 9 and 10, so that when locking cotter 70 is displaced within tangential hole 10, the locking cotter may be fitted in groove 60 by way of aperture 18, likewise locking cotter 20, with slope 71 contacting flat surface 9 of the shank in a wedge fashion, as in the inclined surface of the preceding embodiment, and the longitudinal opposite arcuate shoulder portions 72 engaging the opposing arcuate rising wall portions 61 of groove 60, whereby an unwanted displacement in the axial direction of the straight shank is impeded. In the arrangements so far described, locking cotter 70 is fitted in groove 60, with the opposite arcuate shoulder portions 72 engaging the opposing arcuate rising wall portions 61 of the groove, and it may be so arranged, in some cases, that only a single arcuate shoulder portion of the cotter engages one arcuate rising wall portion of the groove.

In the first embodiment, two assemblies each consisting of tangential hole 10, locking cotter 20 and flat surface 9 are provided in axially aligned relation to each other, and it is selective how many assemblies are provided and where such assemblies are placed, as the case may be.

In assembly, straight shank 4 is first inserted into bore 5, with each flat surface 9 meeting with a marking 80 (FIG. 7) provided on the outer peripheral surface 11 of the holder body, and then locking screw 30 is turned to cause locking cotter 20 to advance towards the flat surface of the shank within the tangential slot, whereby slope 21 of each locking cotter 20 mates with each flat surface 9 of the straight shank.

In operation, straight shank 4 of a cutting tool is first inserted into bore 5 of the tool holder, with each flat surface 9 meeting with each marking 80 until the positional relationship shown in FIG. 3 is established. When locking screw 30 is turned in one direction by engaging a screw driver with the hexagonal hole in head portion 31 from bolt-insertion opening 14, then locking cotter 20 is moved toward each flat surface 9. With the progressive turning of locking screw 30, locking cotter 20 is caused to go deeply into tangential hole 10, thereby allowing slope 21 to protrude through opening 18 towards flat surface 9 of the shank. The slope is then moved in parallel to flat surface 9 and eventually into close contact with flat surface 9 of the shank in a wedge fashion, as seen in FIG. 2. The turning of locking screw 30 to a further extent experts a thrust P on locking cotter 20 in the axial direction A. As a result, a frictional force by virtue of the wedge effect by respective slope 21 relative to the flat surface is created between the outer peripheral surface 7 of the straight shank 4 and the inner wall 8 of the holder body, whereby the straight shank 4 is locked to the holder body.

When a torque accruing from the cutting force at the cutting operation acts in the direction of an arrow in FIG. 2, a force F in the direction tangential to the shank, namely, the force in the axial direction A of the tangential hole, is produced. Force F, in cooperation with thrust P, acts on the locking cotter in a direction to bring slope 21 into close contact with flat surface 9 of the straight shank, thus providing an improved wedge effect, and hence an increased frictional force to a greater extent. Thus, there results an increased shank-retaining force. Since force F accrues from a torque originating from the cutting force, it follows that with increase in cutting force, the force F increases, and the frictional force due to the wedge effect increases proportionally, thus providing an increased shank-retaining force, whereas the straight shank is firmly locked to the holder during the cutting operation.

After termination of the cutting operation, the force F acting on locking cotter 20 is lost, whereas locking screw 30 is free to turn. In locking screw 30 is turned in a reverse direction, locking cotter 20 is displaced from the locking position in FIG. 2 to cotter-insertion port 12, and hence slope 21 of locking cotter 20 diverts from flat surface 9 and retracts from aperture 18 eventually to the released position shown in FIG. 3. The straight shank is thus free to be withdrawn from the bore of the holder body smoothly.

Since the tool holder according to the present invention has locking surfaces of a large width provided by the slope of each locking cotter which contacts each flat surface of the straight shank extending in the direction tangential to the outer peripheral surface thereof, then respective locking cotter is resistant to deformation due to a force accruing from the cutting force and acting on the locking surfaces transversely. Furthermore, since each locking cotter is tightened to each flat surface of the straight shank by means of respective locking screw, vibration incidental to the cutting operation is relieved to some extent by the locking screw serving as a shock absorber, rather than is transmitted directly to the slope of each locking cotter, thus eliminating a risk that engagement of the slope with the flat surface becomes released.

Particularly, according to the present invention, there is provided a locking cotter having a slope, namely wedge-shaped locking surface, movable at an angle with respect to each flat surface of the straight shank along the tangential hole running in a direction tangential to the outer periphery of the shank, and a torque accruing from the cutting force is caused to act on the wedge-shaped locking surface so as to be utilizing as a thrust for the wedge. Therefore, by virtue of the torque increasing in proportion to the increasing cutting force during the progressive cutting operation, the wedge-shaped locking surface is brought into engagement with the flat surface more closely to provide an increased frictional force, whereby the straight shank may be locked to the holder body firmly throughout the cutting operation.

What is claimed is:

1. A tool holder for holding a shank, said shank having a flat surface on the outer circumference thereof, comprising:
   a holder body having an axial bore therein adapted to receive said shank;
   a tangential hole extending through said holder body in a direction substantially tangential to said bore, said tangential hole intersecting said bore to define an aperture between said hole and said bore, said aperture being positioned to register with the flat surface of a shank received in said bore;
   a locking element displaceable within said tangential hole, said locking element including a locking cotter having a sloping surface, said sloping surface being adapted to wedgingly engage through said aperture with the flat surface of a shank received in said bore, said locking cotter having an axial groove on an outer peripheral surface thereof;
   means for limiting the movement of said locking cotter mounted in said holder body, said means for limiting being engaged with said axial groove whereby said sloping surface is maintained in engaging alignment with said flat surface; and
   thrust means for moving said locking cotter within said tangential hole, said thrust means including a locking screw threadably reeived in an axially extending threaded opening in said locking cotter, whereby rotation of said locking screw moves said locking cotter along said tangential hole into or away from engagement with a shank received in said bore.

2. A tool holder as defined in claim 1, wherein one extremity of said axial groove is closed, thereby limiting displacement of said locking cotter.

3. A tool holder as defined in claim 1, wherein said tangential hole consists of a cotter passage open from a first location on an outer peripheral wall of said holder body and receiving therein the locking cotter loosely, and a threaded hole open from a second location on said outer peripheral wall said threaded hole being generally in axial alignment with said cotter passage and receiving therein said locking screw in a threaded manner.

4. A tool holder as defined in claim 3, wherein said locking screw has a threaded head portion adapted to be threaded into said threaded hole, and a threaded portion threaded into said axially extending threaded opening in said locking cotter.

5. A tool holder as defined in claim 1, wherein said tangential hole is a stepped hole, said stepped hole having generally in axial alignment a cotter passage open from one location on an outer peripheral wall of said holder body and receiving therein the locking cotter loosely, a screwhead receiving hole open from a second location on said outer peripheral wall, and a diametrically reduced portion leading from said screw-head receiving hole to said cotter passage.

6. A tool holder as defined in claim 5, wherein said locking screw has a head portion loosely fitted in said screw-head receiving hole of said tangential hole, a stem portion carried by said diametrically reduced portion of said tangential hole, and a threaded portion threaded into the axially extending threaded opening in the locking cotter.

7. A tool holder as defined in claim 6, wherein a stop ring engageable with the head portion of the locking screw is loosely fitted in said screw-head receiving hole.

8. A tool holder as defined in claim 1, including at least two tangential holes extending through said holder body; and a single locking cotter disposed in each said tangential hole.

9. A tool holder as defined in claim 1, wherein said axial groove extends at a portion of said locking cotter which is diametrically opposite to said sloping surface.

10. A tool holder as defined in claim 1, wherein said means for limiting includes a set screw mounted in said holder body, the tip of said set-screw engaging said axial groove.

11. A tool holder as defined in claim 1, wherein said tangential hole includes in axial alignment a cotter passage open from one location on an outer peripheral wall of said holder body and receiving therein said locking cotter loosely, and a threaded hole open from a second location on the said outer peripheral wall of said holder body and receiving therein said locking screw.

* * * * *